(12) United States Patent
Ho et al.

(10) Patent No.: US 11,074,085 B2
(45) Date of Patent: Jul. 27, 2021

(54) METHODS AND APPARATUS FOR BOOT TIME REDUCTION IN A PROCESSOR AND PROGRAMMABLE LOGIC DEVICE ENVIRONMENT

(71) Applicant: Intel Corporation, Santa Clara, CA (US)

(72) Inventors: Yah Wen Ho, Penang (MY); Vincent Zimmer, Federal Way, WA (US); Tung Lun Loo, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/642,318

(22) PCT Filed: Sep. 26, 2017

(86) PCT No.: PCT/US2017/053489
§ 371 (c)(1),
(2) Date: Feb. 26, 2020

(87) PCT Pub. No.: WO2019/066780
PCT Pub. Date: Apr. 4, 2019

(65) Prior Publication Data
US 2021/0026652 A1    Jan. 28, 2021

(51) Int. Cl.
*G06F 9/4401*    (2018.01)
*G06F 13/42*    (2006.01)

(52) U.S. Cl.
CPC .......... *G06F 9/4418* (2013.01); *G06F 9/4405* (2013.01); *G06F 9/4406* (2013.01); *G06F 13/4221* (2013.01); *G06F 2213/0026* (2013.01)

(58) Field of Classification Search
CPC .... G06F 9/4418; G06F 9/4405; G06F 9/4406; G06F 13/4221; G06F 2213/0026
See application file for complete search history.

(56) References Cited

U.S. PATENT DOCUMENTS

| 6,058,475 A | * | 5/2000 | McDonald .......... G06F 11/1417 713/2 |
| 6,336,185 B1 | | 1/2002 | Sargenti, Jr. et al. |

(Continued)

FOREIGN PATENT DOCUMENTS

WO    0157569    8/2001

OTHER PUBLICATIONS

Patent Cooperation Treaty, "International Search Report," issued in connection with International Patent Application No. PCT/US2017/053489, dated Jun. 18, 2018, 4 pages.

(Continued)

*Primary Examiner* — Glenn A. Auve
(74) *Attorney, Agent, or Firm* — Hanley, Flight & Zimmerman, LLC (57) ABSTRACT

Methods and apparatus for boot time reduction in a processor and programmable logic device environment are disclosed. An example apparatus includes a multicore processor including a first core and a second core. A bootstrap processor is to initialize the first core into a standby mode and initialize the second core into a non-standby mode. A programmable logic device is to be programmed with instructions to be executed by the programmable logic device by the second core via a first connection initialized by the second core. The bootstrap processor is to, upon completion of the programming of the programmable logic device, initialize a data connection between the programmable logic device and the second core.

20 Claims, 5 Drawing Sheets

(56) References Cited

U.S. PATENT DOCUMENTS

| | | | |
|---|---|---|---|
| 7,181,608 B2* | 2/2007 | Fallon | G06F 9/4408 713/2 |
| 8,880,862 B2* | 11/2014 | Fallon | G06F 3/0676 713/2 |
| 2003/0145194 A1 | 7/2003 | O'Shea et al. | |
| 2007/0038850 A1* | 2/2007 | Matthews | G06F 9/4401 713/1 |
| 2007/0157015 A1* | 7/2007 | Swanson | G06F 9/4401 713/2 |
| 2011/0055540 A1 | 3/2011 | Lin et al. | |
| 2011/0126209 A1* | 5/2011 | Housty | G06F 9/4405 718/105 |
| 2012/0054481 A1* | 3/2012 | Walker | G06F 9/4401 713/2 |
| 2012/0096256 A1* | 4/2012 | Kim | G06F 9/4418 713/2 |
| 2014/0006767 A1 | 1/2014 | Chang et al. | |
| 2014/0281463 A1* | 9/2014 | Even | G06F 1/32 713/2 |
| 2015/0143092 A1* | 5/2015 | Senda | G06F 9/4405 713/1 |
| 2015/0339129 A1* | 11/2015 | Divakaran | G06F 9/48 713/2 |

OTHER PUBLICATIONS

International Searching Authority, "Written Opinion," issued in connection with International Patent Application No. PCT/US2017/053489, dated Jun. 18, 2018, 7 pages.

International Searching Authority, "International Preliminary Report on Patentability," issued in connection with Intenational Patent Application No. PCT/US2017/053489, dated Mar. 31, 2020, 8 pages.

* cited by examiner

METHODS AND APPARATUS FOR BOOT TIME REDUCTION IN A PROCESSOR AND PROGRAMMABLE LOGIC DEVICE ENVIRONMENT

FIELD OF THE DISCLOSURE

This disclosure relates generally to boot time reduction, and, more particularly, to methods and apparatus for boot time reduction in a processor and programmable logic device environment.

BACKGROUND

Programmable logic devices are electronic components that can be programmed to perform different tasks. Programmable logic devices can be used in combination with processor systems to offload processing tasks from a processor to the programmable logic device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Programmable logic devices can be used in combination with processor systems to offload processing tasks from the processor to the programmable logic device. In such an arrangement, the ability to quickly boot and access the functionality provided by the programmable logic device (e.g., the time to boot the processor and programmable logic device) is a concern. For example, such processor and programmable logic device arrangements may be used in an automotive environment. In such an example, vehicle safety regulations may require that the vehicle display a rearview image within two seconds of the vehicle's direction selector being placed in reverse. Given that other system initialization is included in those two seconds, the total allowed boot time is approximately three hundred milliseconds. Example approaches disclosed herein reduce the boot sequence to better facilitate meeting such boot-time requirements in systems including processors and programmable logic devices.

In examples disclosed herein, the programmable logic device is implemented using a Field Programmable Gate Array (FPGA). However, any other past, present, and/or future type of programmable logic device may additionally or alternatively be used. In examples disclosed herein, the FPGA is a flash-based design, meaning that the internal logical configuration is lost upon removal of power (e.g., car engine turned off). Thus, the programmable logic device needs to be re-initialized at every boot sequence.

In prior approaches to initializing an application processor and programmable logic device configurations, system firmware initializes central processing unit (CPU) cores into standby. On previous implementations, only the Boot Strap Processor (BSP) core is running while the Application Processor (AP) is put into standby. In examples disclosed herein, at least one application core is executed in parallel with the BSP for initialization of the logic device.

Figure 1:
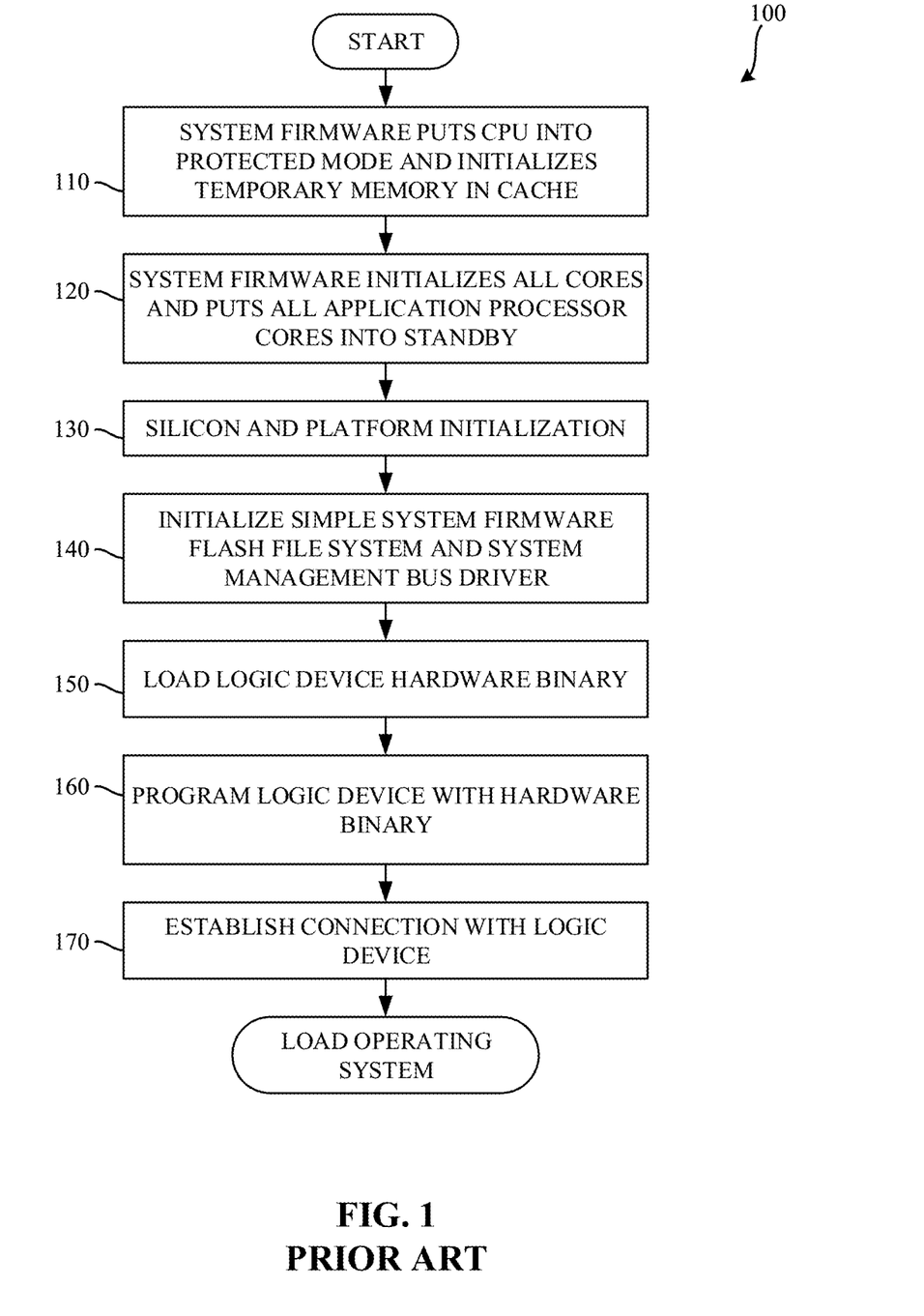
FIG. 1 is an example prior art approach to booting a processor and programmable logic device environment.

FIG. 1 is an example prior art approach 100 to booting a processor and programmable logic device environment. The example process 100 the illustrated example of FIG. 1 begins at boot time of the prior art processor and logic device environment. Example system firmware puts a CPU into a protected mode initializes a temporary memory in a cache. (Block 110). The example system firmware initializes cores of the processor and puts all cores into a standby mode. (Block 120). Silicon and platform initialization are then performed. (Block 130). Simple system firmware is initialized, and the file system and system management bus drivers are flashed. (Block 140).

The logic device hardware binary is loaded. (Block 150). In prior art examples, the logic device hardware binary is loaded from an electrically erasable programmable read only memory (EEPROM). Storing the hardware binary in an EEPROM is disadvantageous because, for example, physical memory space is required for the EEPROM, memory capacity of the EEPROM is limited, race conditions can be encountered when initializing the logic device, security concerns are encountered when protecting the physical package of the EEPROM, etc.

The logic device hardware binary is then programmed to the logic device. (Block 160). A connection is then established between the logic device and the application processor. (Block 170). Control is passed to the operating system and the example process 100 of FIG. 1 terminates.

Figure 2:
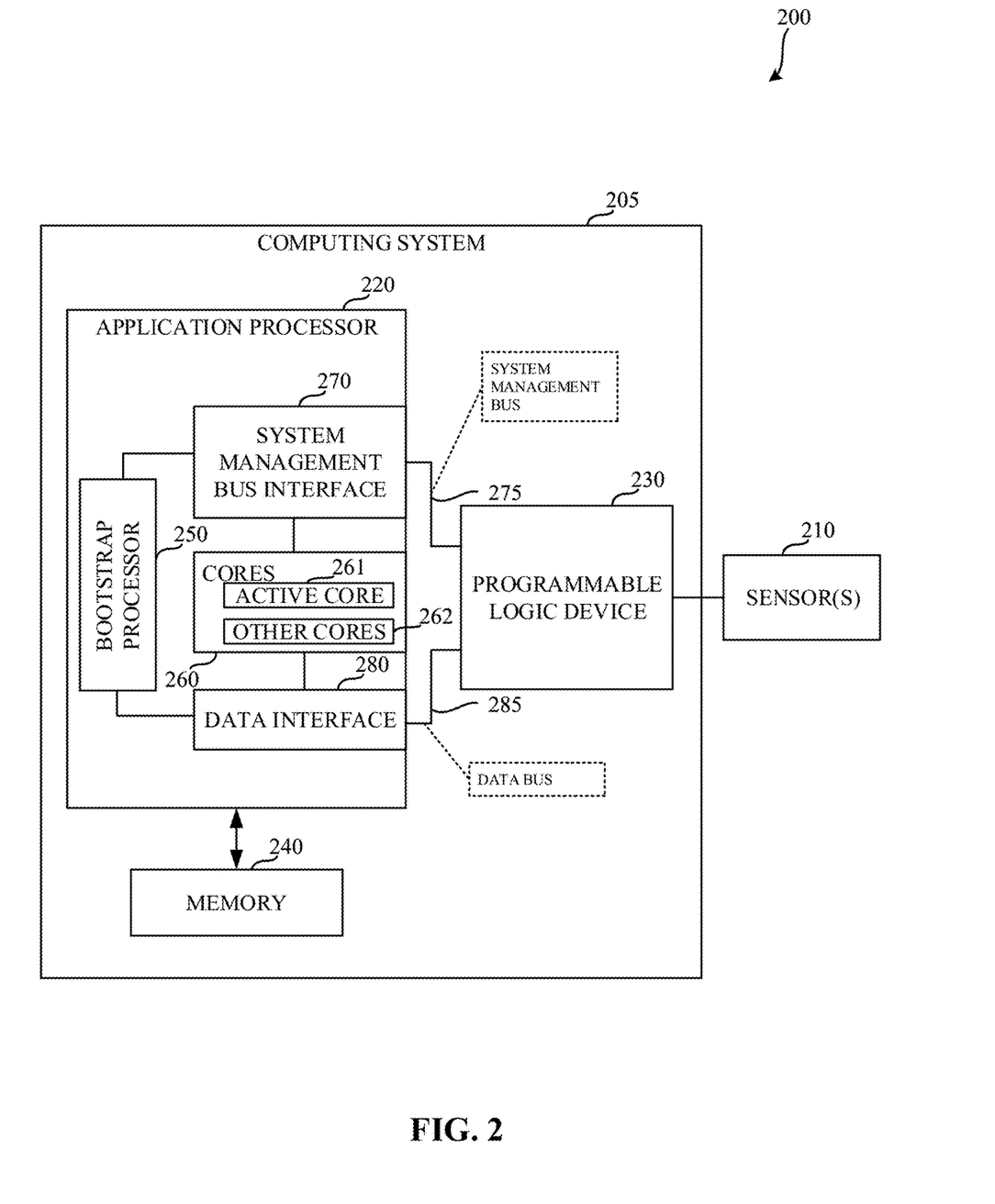
FIG. 2 is an example environment of use including a computing system having a programmable logic device and including one or more sensors.

FIG. 2 is an example environment of use 200 including a computing system 205 and one or more sensors 210. The example computing system includes an application processor 220, a programmable logic device 230, and a memory 240. The example application processor 220 includes a bootstrap processor 250, two or more cores 260, a system management bus interface 270, and a data interface 280. The example system management bus interface communicates with the programmable logic device 230 via a system management bus 275 to program the programmable logic device 230. The example data interface 280 communicates with the programmable logic device 230 via a data bus 285.

The example sensors 210 of the illustrated example of FIG. 2 are implemented by image sensors (e.g., a camera). However, any other type(s) and/or number(s) of sensors may additionally or alternatively be used. For example, in an automotive context, a rear-view camera may be used in connection with distance sensors. In examples disclosed herein, the example programmable logic device 230 interfaces with the sensor(s) 210 and provides an interface (e.g., the data bus 285) to enable the application processor 220 to receive data from the sensor(s) 210. In some examples, the programmable logic device performs additional processing and/or interpretation of the data received from the sensor(s) 210 before passing such data to the application processor 220. While sensor(s) 210 are shown in the illustrated example of FIG. 2, such sensors are not required. In some examples, the sensor(s) 210 may be included as a component of the computing system 205.

The example application processor 220 of the illustrated example of FIG. 2 is implemented by a multi-core hardware processor. The example application processor 220 includes components such as the bootstrap processor 250, the cores 260, the system management bus interface 270, and the data interface 280 that execute instructions and/or enable the application processor 220 to interface with other external devices such as, for example, the memory 240, the programmable logic device 230, etc. In some examples, the memory 240 is included as a component of the application processor 220.

The example bootstrap processor 250 of the illustrated example of FIG. 2 is implemented by a processor executing instructions to initialize the application processor 220 for execution of an operating system. In examples disclosed herein, the example bootstrap processor 250 executes a set of instructions to, for example, initialize the cores 260 of the application processor 220, perform silicon and/or platform initialization, initialize the example data interface 280, etc. In examples disclosed herein, the instructions executed by the example bootstrap processor 250 implement a Unified Extensible Firmware Interface (UEFI) system. However, any other boot system may additionally or alternatively be implemented such as, for example, a Basic Input-Output System (BIOS). In examples disclosed herein, instead of initially placing all of the cores 260 into a standby mode, one of the cores (e.g., an active core 261) is not placed into the standby mode. Leaving the active core 261 out of standby mode enables the active core 261 to perform initialization tasks, thereby reducing the overall boot-time of the computing system 205.

The example cores 260 of the illustrated example of FIG. 2 include two or more processing cores. In examples disclosed herein, each of the example cores 260 is implemented by a hardware circuit. For example, the example cores 260 can be implemented by one or more integrated circuits, logic circuits, microprocessors or controllers from any desired family or manufacturer. The example cores 260 may be a semiconductor based (e.g., silicon based) device. However, any other type of circuitry may additionally or alternatively be used. The example cores 260 include the active core 261 and other cores 262. The other cores 262 are those cores that are placed into the standby mode by the bootstrap processor 250.

During booting, ordinarily, each of the cores 260 are initially placed in the standby mode. In such examples, the cores 260 do not leave the standby mode until the bootstrap processor 250 has completed initialization. However, in examples disclosed herein, one of the cores (e.g., the active core 261) is not placed into the standby mode. The core 261 is utilized to program the programmable logic device 230 with a hardware binary, instead of such programming being performed by the bootstrap processor 250. Such an approach results in a reduction of the total amount of time required to boot the computing system 205.

The example system management bus interface 270 of the illustrated example of FIG. 2 is a bus interface that enables the application processor 220 or, more specifically, the active core 261, to program the programmable logic device 230 via the system management bus 275. In examples disclosed herein, the active core 261 initializes the system management bus interface 270. However, the example system management bus 275 may be initialized in any other manner such as, for example, by the example bootstrap processor 250. In examples disclosed herein, the example system management bus interface 270 communicates via the system management bus 275 using a System Management Bus (SMBus) protocol. However, any other communication protocol may additionally or alternatively be used such as, for example, an Inter-Integrated Circuit (I2C) protocol.

The example system management bus 275 of the illustrated example of FIG. 2 is a communication bus that enables the system management bus interface 270 to communicate with the example programmable logic device 230. In examples disclosed herein, the example system management bus 275 carries clock information, data, and instructions to enable the example programmable logic device 230 to be programmed by the system management bus interface 270. However, any other type of bus may additionally or alternatively be used such as, for example, a universal serial bus (USB), a serial connection, an Inter-Integrated Circuit (I2C) bus, etc.

The example data interface 280 of the illustrated example of FIG. 2 enables the application processor 220 to communicate with the programmable logic device 230 via the data bus 285. In examples disclosed herein, the data interface 280 is implemented by a Peripheral Component Interconnect Express (PCIe) interface. However, any other past, present, and/or future type(s) of interface(s) may additionally or alternatively be used. While in the illustrated example of FIG. 2, the example data interface 280 enables the application processor 220 to communicate with the programmable logic device 230, in some examples, the data interface 280 enables the application processor 220 to communicate with other devices such as, for example, memory devices, the sensor(s) 210, etc.

The example data bus 285 of the illustrated example of FIG. 2 is implemented by a Peripheral Component Interconnect Express (PCIe) bus. However, any other bus structure may additionally or alternatively be used. For example, the example data bus 285 may be implemented by a serial bus, an I2C bus, etc. In examples disclosed herein, the example data bus 285 enables higher data rates to be achieved for communication between the application processor 220 and the programmable logic device 230 as compared to the system management bus 275.

The example programmable logic device 230 of the illustrated example of FIG. 2 implements logic that enables outputs from the sensor(s) 210 to be read by the computing system 205. In examples disclosed herein, the programmable logic device is implemented using a Field Programmable Gate Array (FPGA). However, any other past, present, and/or future type of programmable logic device may additionally or alternatively be used such as, for example, an application specific integrated circuit (ASIC), a complex programmable logic device (CPLD), a programmable logic device (PLD), etc. In examples disclosed herein, the programmable logic device 230 is a flash-based design, meaning that the internal logical configuration is lost upon removal of power (e.g., when a car engine is turned off).

The example memory 240 of the illustrated example of FIG. 2 is implemented by a flash memory. However, any other type of memory device may additionally or alternatively be used. For example, the example memory 240 may be implemented by a mass storage device and/or memory technology such as NAND flash memory, NOR flash memory, three dimensional cross-point (3D Cross-point) memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, phase change memory with switch, magnetoresistive random access memory (MRAM), spin transfer torque (STT) memory, a floppy disk, a hard drive, etc. In examples disclosed herein, the memory 240 stores a firmware layout that includes, for example, the hardware binary that is to be programmed to the programmable logic device 230.

Figure 3:
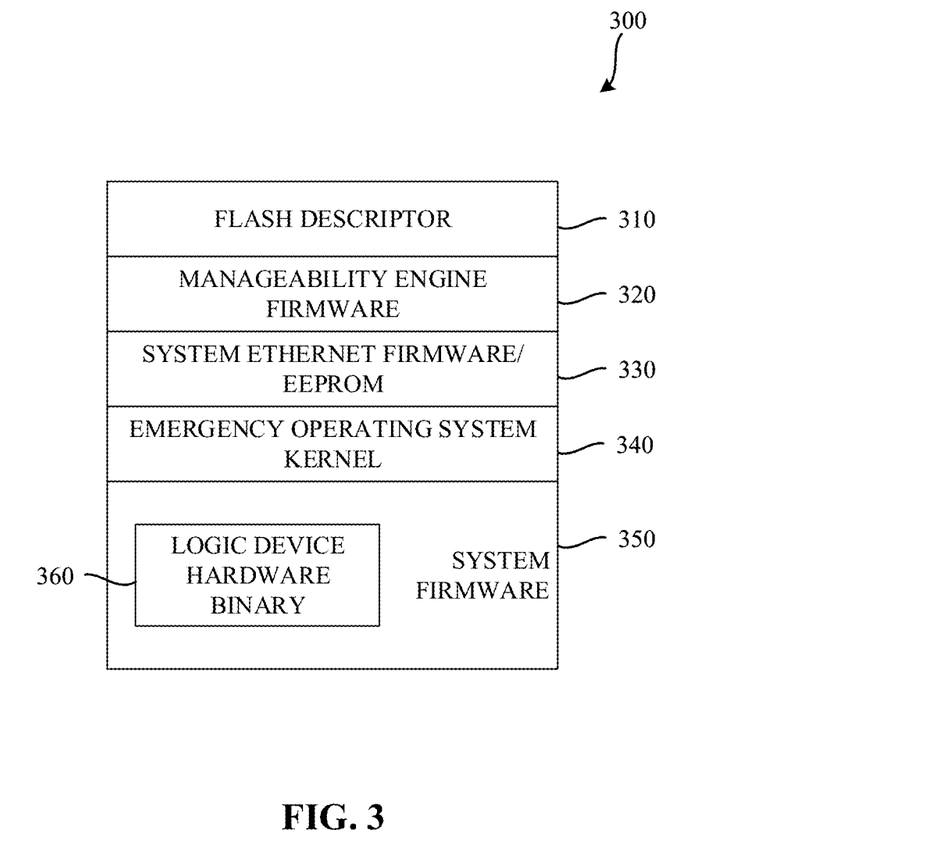
FIG. 3 is an example firmware layout including the logic device hardware binary included in the system firmware.

FIG. 3 is an example firmware layout including a logic device hardware binary 360 included in an integrated firmware image layout 300. The example integrated firmware image layout 300 of the illustrated example of FIG. 3 includes a flash descriptor sector 310, a manageability engine firmware sector 320, a system Ethernet firmware sector 330, an emergency operating system kernel sector 340, and a system firmware sector 350. In the illustrated example of FIG. 3, the example system firmware sector 350 includes the logic device hardware binary 360. The example logic device hardware binary 360 includes information and/or instructions that enable the logic device 230 to interact with the sensors 210.

While an example manner of implementing the example computing system 205 is illustrated in FIG. 2, one or more of the elements, processes and/or devices illustrated in FIG. 2 may be combined, divided, re-arranged, omitted, eliminated and/or implemented in any other way. Further, the example application processor 220, the example bootstrap processor 250, the example cores 260, the example system management bus interface 270, the example data interface 280, the example programmable logic device 230, the example memory 240, and/or, more generally, the example computing system 205 of FIG. 2 may be implemented by hardware, software, firmware and/or any combination of hardware, software and/or firmware. Thus, for example, any of the example application processor 220, the example bootstrap processor 250, the example cores 260, the example system management bus interface 270, the example data interface 280, the example programmable logic device 230, the example memory 240, and/or, more generally, the example computing system 205 of FIG. 2 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example application processor 220, the example bootstrap processor 250, the example cores 260, the example system management bus interface 270, the example data interface 280, the example programmable logic device 230, the example memory 240, and/or, more generally, the example computing system 205 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing system 205 of FIG. 2 may include one or more elements, processes and/or devices in addition to, or instead of, those illustrated in FIG. 2, and/or may include more than one of any or all of the illustrated elements, processes, and devices.

Figure 4:
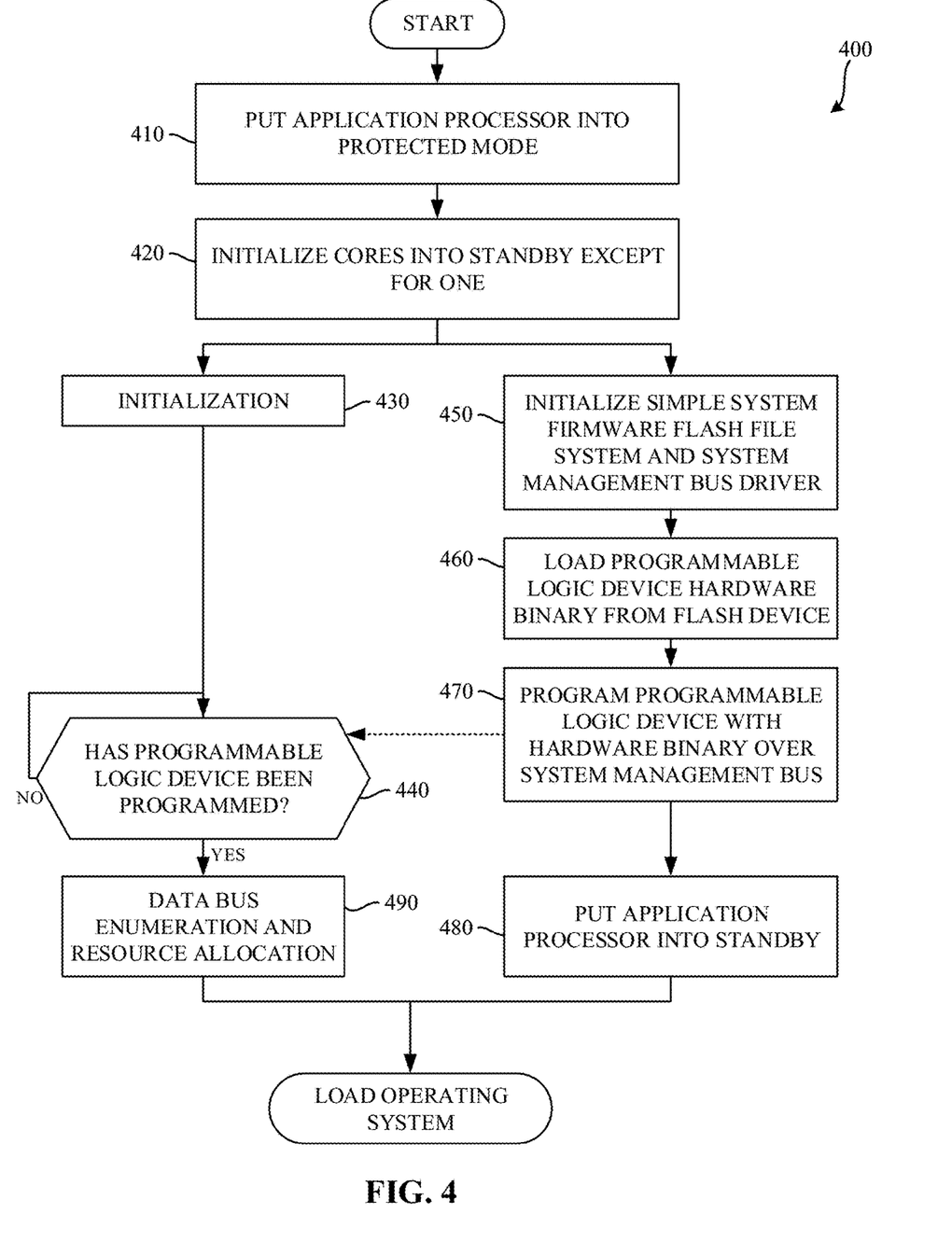
FIG. 4 is a flowchart representative of example machine-readable instructions which, when executed, cause the example computing system of FIG. 2 to boot.

A flowchart representative of example machine readable instructions for implementing the example computing system 205 of FIG. 2 is shown in FIG. 4. In this example, the machine readable instructions comprise a program for execution by a processor such as the processor 512 shown in the example processor platform 500 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example computing system 205 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is a flowchart representative of example machine-readable instructions which, when executed, cause the example computing system 205 to boot. The program 400 of FIG. 4 begins upon receipt of an indication that the computing system 205 is to be booted. The example process 400 begins when the example bootstrap processor 250 puts the application processor 220 into a protected mode. (Block 410). As used herein, the protected mode is a mode of operation in which instructions executed by the application processor 220 are restricted to addressing a limited area of memory. Limiting the area of memory in which instructions are allowed to access ensures that data is not unintentionally overwritten.

The example bootstrap processor 250 then initializes all cores 260 of the application processor 220 into the standby mode with the exception of the active core 261. (Block 420). In examples disclosed herein, the standby mode is a sleep mode in which a clock of the application processor 220 remains running, but a clock tree that drives the cores 260 is disabled. As noted above, at least one of the cores (e.g., the active core 261) is not placed into the standby mode. The example bootstrap processor 250 performs silicon and platform initialization. (Block 430). In examples disclosed herein, the example bootstrap processor 350 performs a platform initialization procedure in accordance with a UEFI specification (e.g., the UEFI Specification 2.7). However, any other type of platform initialization according to any other specification may additionally or alternatively be performed. The example data interface 280 then waits for the data bus 285 to be initialized. (Block 440).

In parallel, (e.g., while the bootstrap processor 250 performs the platform initialization(s) (block 430)), the example active core 261 initializes the programmable logic device 230. That is, the bootstrap processor 250 performs initialization tasks while the example active core 261 initializes the programmable logic device 230. In contrast to the example process 100 of the illustrated example of FIG. 1, such initialization is performed in parallel with initialization operations of the bootstrap processor 250. Performing the initialization and programming of the programmable logic device in parallel enables a reduction in the amount of time taken to complete the initialization. While the bootstrap processor 250 is performing its silicon and platform initialization (Block 430), the active core 261 initializes the system management bus interface 270. (Block 450). In some examples, initializing the system management bus interface 270 includes initialization of the system management bus 275. In some examples, initialization of the system management bus interface 270 is performed by interacting with the flash memory 240 to load one or more drivers and/or other instructions for interfacing with the system management bus interface 270.

The example active core 261 loads the programmable logic device hardware binary from the flash memory 240. (Block 460). As noted in the illustrated example of FIG. 3 the hardware binary of examples disclosed herein is stored as a component of the system firmware. However, the example hardware binary may be stored in any other location and/or in any other fashion.

The example active core 261 programs the programmable logic device 230 via the system management bus interface 270 and the example system management bus 275. (Block 470). Upon programming of the programmable logic device 230, the data bus 285 is established, resulting in block 440 returning a result of YES. The example core that was not put into standby then enters the standby mode. (Block 480).

Returning to block 440, once the example data bus 285 is initialized (e.g., upon block 440 returning a result of YES), the example data interface 280 enumerates the data bus 285 and allocates resources to the data bus connection. (Block 490). At this point, the logic device is initialized as a data endpoint for the application processor 220. The example boot process 400 of FIG. 4 terminates, and control is passed to the operating system.

Figure 5:
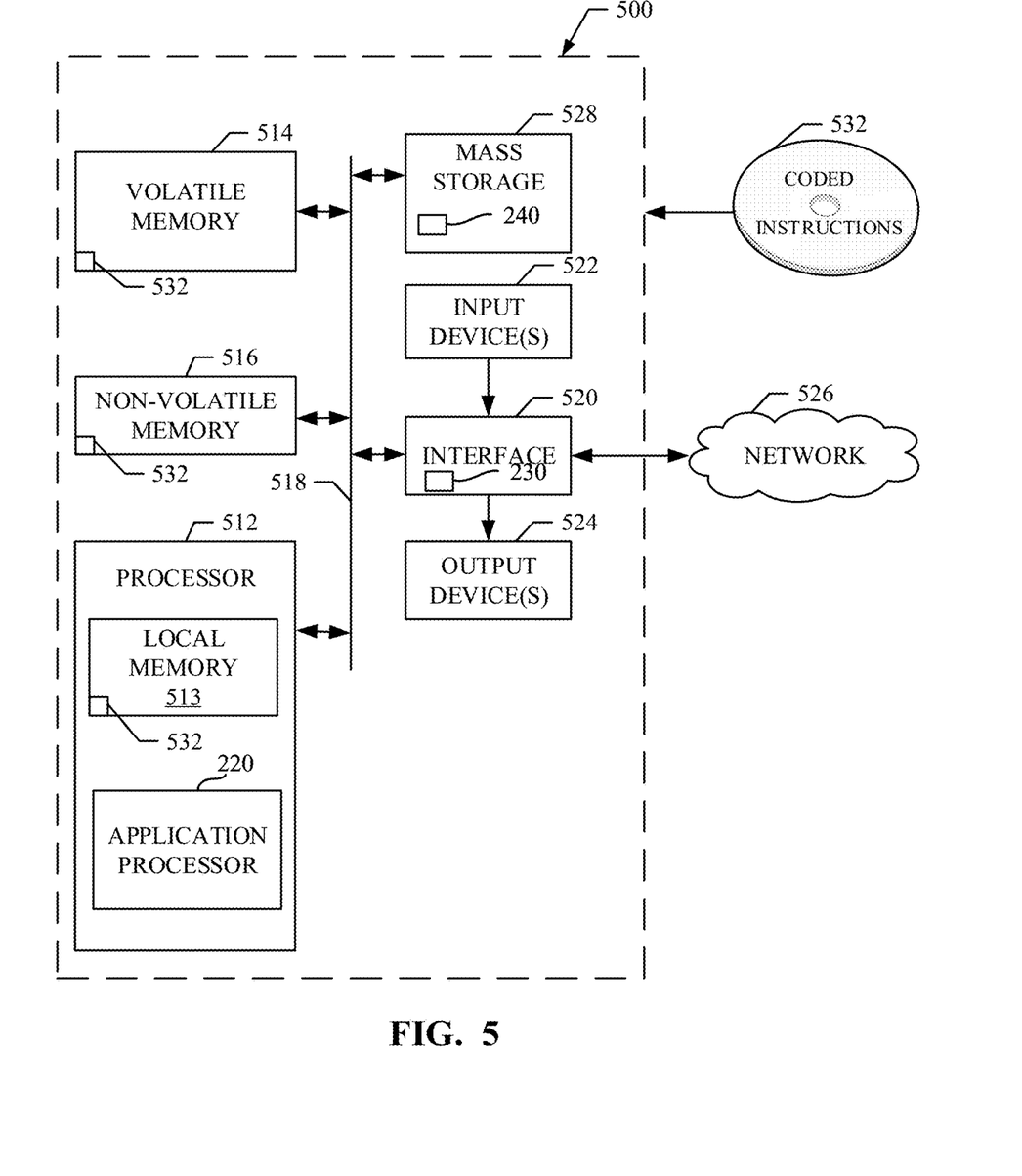
FIG. 5 is a block diagram of an example processing platform structured to execute the instructions of FIG. 4 to implement the example computing system of FIG. 2.

FIG. 5 is a block diagram of an example processor platform 500 capable of executing the instructions of FIG. 4 to implement the computing system 205 of FIG. 2. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware processor may be a semiconductor based (e.g., silicon based) device. In this example, the processor 512 implements the example application processor 220.

The processor 512 of the illustrated example includes a local memory 513 (e.g., a cache). The processor 512 of the illustrated example is in communication with a main memory including a volatile memory 514 and a non-volatile memory 516 via a bus 518. In some examples, the bus 518 includes multiple different buses. The example bus 518 implements the example system management bus 275 and/or the example data bus 285. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.). The example interface 520 implements the example programmable logic device 230.

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that example methods, apparatus, and articles of manufacture have been disclosed that results in a reduction of the total amount of time required to boot a computing system including an application processor and a programmable logic device. Example approaches disclosed herein parallelize initialization operations between a bootstrap processor and a core of an application processor. In examples disclosed herein, because initialization procedures are distributed among different components of the application processor, the total amount of time required to boot and/or otherwise initialize a computing system is reduced.

Example 1 includes an apparatus to reduce a boot time in a processor and programmable logic device environment, the apparatus comprising a multicore processor including a first core and a second core; a bootstrap processor to initialize the first core into a standby mode and initialize the second core into a non-standby mode; a programmable logic device to be programmed with instructions to be executed by the programmable logic device by the second core via a first connection initialized by the second core, the bootstrap processor to, upon completion of the programming of the programmable logic device, initialize a data connection between the programmable logic device and the second core.

Example 2 includes the apparatus of example 1, wherein the bootstrap processor is further to, upon completion of the programming of the programmable logic device, place the second core into the standby mode.

Example 3 includes the apparatus of example 1, wherein the programmable logic device is a field programmable gate array.

Example 4 includes the apparatus of example 1, wherein the bootstrap processor is further to, prior to completion of the programming of the programmable logic device by the second core, perform a platform initialization procedure.

Example 5 includes the apparatus of example 1, wherein the data connection is implemented using a Peripheral Component Interconnect Express interface.

Example 6 includes the apparatus of any one of examples 1 through 5, further including a memory to store the instructions to be executed by the programmable logic device.

Example 7 includes the apparatus of example 6, wherein the instructions to be executed by the programmable logic device are included in a system firmware stored in the memory.

Example 8 includes at least one non-transitory computer-readable medium comprising instructions which, when executed, cause a machine to at least initialize a first core of a multicore processor into a standby mode; initialize a second core of the multi-core processor into a non-standby mode; initialize a first connection between the second core and a programmable logic device; program, via the first connection, the programmable logic device with logical instructions to be executed by the programmable logic device; and upon completion of the programming of the programmable logic device, initialize a second connection between the programmable logic device and the second core.

Example 9 includes the at least one non-transitory computer-readable medium of example 8, further including, upon completion of the programming of the programmable logic device, placing the second core into the standby mode.

Example 10 includes the at least one non-transitory computer-readable medium of example 8, wherein the first connection is implemented using a system management bus.

Example 11 includes the at least one non-transitory computer-readable medium of example 8, wherein the programmable logic device is a field programmable gate array.

Example 12 includes the at least one non-transitory computer-readable medium of example 8, wherein the instructions, when executed, further cause the machine to perform, prior to completion of the programming of the programmable logic device, a platform initialization procedure.

Example 13 includes the at least one non-transitory computer-readable medium of example 8, wherein the second connection is implemented using a Peripheral Component Interconnect Express interface.

Example 14 includes the at least one non-transitory computer-readable medium of any one of examples 8 through 13, wherein the instructions, when executed, further cause the machine to read the logical instructions to be executed by the programmable logic device from a memory.

Example 15 includes the at least one non-transitory computer-readable medium of example 14, wherein the logical instructions to be executed by the programmable logic device are included in a system firmware stored in the memory.

Example 16 includes a method of reducing a boot time in a processor and programmable logic device environment, the method comprising initializing, by executing an instruction with a bootstrap processor, a first core of a multicore processor into a standby mode; initializing, by executing an instruction with the bootstrap processor, a second core of the multi-core processor into a non-standby mode; initializing, by executing an instruction with the second core, a first connection between the second core and a programmable logic device; programming, by executing an instruction with the second core, via the first connection, the programmable logic device with instructions to be executed by the programmable logic device; and upon completion of the programming of the programmable logic device, initializing, by executing an instruction with the bootstrap processor, a second connection between the programmable logic device and the second core.

Example 17 includes the method of example 16, further including, upon completion of the programming of the programmable logic device, placing the second core into the standby mode.

Example 18 includes the method of example 16, wherein the first connection is implemented using a system management bus.

Example 19 includes the method of example 16, wherein the programmable logic device is a field programmable gate array.

Example 20 includes the method of example 16, further including performing, prior to completion of the programming of the programmable logic device and by executing an instruction with the bootstrap processor, a platform initialization procedure.

Example 21 includes the method of example 16, wherein the second connection is implemented using a Peripheral Component Interconnect Express interface.

Example 22 includes the method of any one of examples 16 through 21, further including reading, by executing an instruction with the second core, the instructions to be executed by the programmable logic device from a memory.

Example 23 includes the method of example 22, wherein the instructions to be executed by the programmable logic device are included in a system firmware stored in the memory.

Example 24 includes an apparatus to reduce a boot time in a processor and programmable logic device environment, the apparatus comprising first means for initializing a first core of a multicore processor into a standby mode, and a second core of the multi-core processor into a non-standby mode; second means for initializing a first connection between the second core and a programmable logic device; means for programming via the first connection, the programmable logic device with instructions to be executed by the programmable logic device; and third means for initializing, upon completion of the programming of the programmable logic device, a second connection between the programmable logic device and the second core.

Example 25 includes the apparatus of example 24, further including means for placing, upon completion of the programming of the programmable logic device, the second core into the standby mode.

Example 26 includes the apparatus of example 24, wherein the first connection is implemented using a system management bus.

Example 27 includes the apparatus of example 24, wherein the programmable logic device is a field programmable gate array.

Example 28 includes the apparatus of example 24, further including means for performing, prior to completion of the programming of the programmable logic device and by executing an instruction with the bootstrap processor, a platform initialization procedure.

Example 29 includes the apparatus of example 24, wherein the second connection is implemented using a Peripheral Component Interconnect Express interface.

Example 30 includes the apparatus of any one of examples 24 through 29, further including means for reading the instructions to be executed by the programmable logic device from a memory.

Example 31 includes the apparatus of example 30, wherein the instructions to be executed by the programmable logic device are included in a system firmware stored in the memory.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to reduce a boot time in a processor and programmable logic device environment, the apparatus comprising:
   a multicore processor including a first core and a second core;
   a bootstrap processor to initialize the first core into a standby mode and initialize the second core into a non-standby mode;
   a programmable logic device to be programmed with instructions to be executed by the programmable logic device by the second core via a first connection initialized by the second core, the bootstrap processor to, upon completion of the programming of the programmable logic device, initialize a data connection between the programmable logic device and the second core.

2. The apparatus of claim 1, wherein the bootstrap processor is further to, upon completion of the programming of the programmable logic device, place the second core into the standby mode.

3. The apparatus of claim 1, wherein the programmable logic device is a field programmable gate array.

4. The apparatus of claim 1, wherein the bootstrap processor is further to, prior to completion of the programming of the programmable logic device by the second core, perform a platform initialization procedure.

5. The apparatus of claim 1, wherein the data connection is implemented using a Peripheral Component Interconnect Express interface.

6. The apparatus of claim 1, further including a memory to store the instructions to be executed by the programmable logic device.

7. The apparatus of claim 6, wherein the instructions to be executed by the programmable logic device are included in a system firmware stored in the memory.

8. At least one non-transitory computer-readable medium comprising instructions which, when executed, cause a machine to at least:
   initialize a first core of a multicore processor into a standby mode;
   initialize a second core of the multicore processor into a non-standby mode;
   initialize a first connection between the second core and a programmable logic device;
   program, via the first connection, the programmable logic device with logical instructions to be executed by the programmable logic device; and
   upon completion of the programming of the programmable logic device, initialize a second connection between the programmable logic device and the second core.

9. The at least one non-transitory computer-readable medium of claim 8, further including, upon completion of the programming of the programmable logic device, placing the second core into the standby mode.

10. The at least one non-transitory computer-readable medium of claim 8, wherein the first connection is implemented using a system management bus.

11. The at least one non-transitory computer-readable medium of claim 8, wherein the programmable logic device is a field programmable gate array.

12. The at least one non-transitory computer-readable medium of claim 8, wherein the instructions, when executed, further cause the machine to perform, prior to completion of the programming of the programmable logic device, a platform initialization procedure.

13. The at least one non-transitory computer-readable medium of claim 8, wherein the second connection is implemented using a Peripheral Component Interconnect Express interface.

14. The at least one non-transitory computer-readable medium of claim 8, wherein the instructions, when executed, further cause the machine to read the logical instructions to be executed by the programmable logic device from a memory.

15. The at least one non-transitory computer-readable medium of claim 14, wherein the logical instructions to be executed by the programmable logic device are included in a system firmware stored in the memory.

16. A method of reducing a boot time in a processor and programmable logic device environment, the method comprising:
   initializing, by executing an instruction with a bootstrap processor, a first core of a multicore processor into a standby mode;
   initializing, by executing an instruction with the bootstrap processor, a second core of the multicore processor into a non-standby mode;
   initializing, by executing an instruction with the second core, a first connection between the second core and a programmable logic device;
   programming, by executing an instruction with the second core, via the first connection, the programmable logic device with instructions to be executed by the programmable logic device; and upon completion of the programming of the programmable logic device, initializing, by executing an instruction with the bootstrap processor, a second connection between the programmable logic device and the second core.

17. The method of claim 16, further including, upon completion of the programming of the programmable logic device, placing the second core into the standby mode.

18. The method of claim 16, wherein the first connection is implemented using a system management bus.

19. The method of claim 16, wherein the programmable logic device is a field programmable gate array.

20. The method of claim 16, further including performing, prior to completion of the programming of the programmable logic device and by executing an instruction with the bootstrap processor, a platform initialization procedure.

* * * * *